US011922476B2

(12) United States Patent
Key et al.

(10) Patent No.: US 11,922,476 B2
(45) Date of Patent: Mar. 5, 2024

(54) GENERATING RECOMMENDATIONS BASED ON DESCRIPTORS IN A MULTI-DIMENSIONAL SEARCH SPACE

(71) Applicant: Capital One Services, LLC, McLean, VA (US)

(72) Inventors: Kate Key, Powhatan, VA (US); Vincent Pham, Champaign, IL (US); Jeremy Goodsitt, Champaign, IL (US); Austin Walters, Savoy, IL (US); Galen Rafferty, Mahomet, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 318 days.

(21) Appl. No.: 17/365,272

(22) Filed: Jul. 1, 2021

(65) Prior Publication Data
US 2023/0005038 A1    Jan. 5, 2023

(51) Int. Cl.
*G06Q 30/00* (2023.01)
*G06Q 30/0601* (2023.01)

(52) U.S. Cl.
CPC .............................. *G06Q 30/0625* (2013.01)

(58) Field of Classification Search
None
See application file for complete search history.

(56) References Cited

U.S. PATENT DOCUMENTS

| | | | |
|---|---|---|---|
| 7,398,227 B2 * | 7/2008 | Ismert | G06Q 50/188 705/26.81 |
| 9,846,885 B1 * | 12/2017 | Sarshar | G06Q 30/0201 |
| 10,217,120 B1 | 2/2019 | Shin et al. | |
| 10,896,459 B1 * | 1/2021 | Joseph | G06Q 30/0631 |
| 11,176,942 B2 * | 11/2021 | Di Fabbrizio | G10L 15/063 |
| 11,756,105 B2 * | 9/2023 | Luk | G06Q 30/0631 705/26.82 |
| 2014/0136362 A1 | 5/2014 | Shaya et al. | |
| 2014/0344275 A1 * | 11/2014 | Matsuda | G06Q 30/0631 707/736 |
| 2016/0223347 A1 | 8/2016 | Ricci et al. | |
| 2016/0253737 A1 | 9/2016 | Chang et al. | |
| 2017/0287044 A1 | 10/2017 | Rose et al. | |
| 2018/0300793 A1 | 10/2018 | Chen et al. | |
| 2019/0102801 A1 | 4/2019 | Lee et al. | |
| 2019/0130453 A1 | 5/2019 | Sasapu | |

(Continued)

OTHER PUBLICATIONS

Greg Linden et al. "Amazon.com Recommendations Item-to-Item Collaborative Filtering", IEEE Internet Computing, Jan./Feb. 2003, pp. 76-80. (Year: 2003).*

(Continued)

*Primary Examiner* — Naeem U Haq
(74) *Attorney, Agent, or Firm* — Banner & Witcoff, Ltd.

(57) ABSTRACT

Aspects described herein may relate to methods, systems, and apparatuses that provide new capabilities for recommending purchases to a user based on a new descriptor referred to as "purchase embeddings." The purchase embedding may include a tuple in a new multi-dimensional search space for describing and tracking purchases of goods and services. Recommendations may be based on a distance between tuples in the search space, which provides a measure of similarity between items represented by the tuples.

19 Claims, 12 Drawing Sheets

(56) References Cited

U.S. PATENT DOCUMENTS

| | | |
|---|---|---|
| 2019/0236679 A1 | 8/2019 | Kumar et al. |
| 2019/0362233 A1* | 11/2019 | Aizawa ............... G06F 18/2415 |
| 2020/0233696 A1 | 7/2020 | Jayan et al. |
| 2020/0250728 A1 | 8/2020 | Fredrich et al. |
| 2021/0264467 A1 | 8/2021 | Boal |
| 2022/0138830 A1* | 5/2022 | Laserson ............ G06Q 30/0201 |
| | | 705/26.7 |

OTHER PUBLICATIONS

Evans Doe Ocansey "Using Machine Learning to Predict Customers' Next Purchase Day" Towards Data Science, https://towardsdatascience.com/using-machine-learning-to-predict-customers-next-purchase-day-7895ad49b4db, p. 1-44, Apr. 30, 2021.

* cited by examiner

| | Purchase Embedding | Tuple 1 | Tuple 2 | Tuple 3 | Tuple 4 | ... |
|---|---|---|---|---|---|---|
| 603 | | | | | | |

| | | | | | | |
|---|---|---|---|---|---|---|
| | Name | Name 1 | Name 2 | Name 3 | Name 4 | ... |
| | Part No. | No. 1 | No. 2 | No. 3 | No. 4 | ... |
| 601 | Description | Desc. 1 | Desc. 2 | Desc. 3 | ... | ... |
| | Manufacture | Man. 1 | Man. 2 | ... | ... | ... |
| | Item Parameters | Para. 1 | Para 2. | Para 3. | Para. 4 | ... |
| | Vendor | Vendor 1 | Vendor 2 | Vendor 3 | Vendor 4 | ... |
| | Address | Addr 1 | Addr 2 | Addr 3 | Addr 4 | ... |
| | Date of Sale 1 | Date 1 | Date 2 | Date 3 | Date 4 | ... |
| | Time of Sale 1 | Time 1 | Time 2 | Time 3 | Time 4 | ... |
| | Purchaser of Sale 1 | ID1 | ID2 | ID3 | ID4 | ... |
| 602 | Payment Method of Sale 1 | Method 1 | Method 2 | Method 3 | Method 4 | ... |
| | Price Sale 1 | Date 1 | Date 2 | Date 3 | Date 4 | ... |
| | Tax Sale 1 | Tax 1 | Tax 2 | Tax 3 | Tax 4 | ... |
| | Remaining Stock | Count 1 | Count 2 | Count 3 | Count 4 | ... |
| | Item Parameters | Para. 1 | Para 2. | Para 3. | Para. 4 | ... |

| | | | | | | |
|---|---|---|---|---|---|---|
| | Metric 1 | Value 1-1 | Value 1-2 | Value 1-3 | Value 1-4 | ... |
| 604 | Metric 2 | Value 2-1 | Value 2-2 | Value 2-3 | ... | ... |
| | Metric 3 | Value 3-1 | ... | ... | ... | ... |

GENERATING RECOMMENDATIONS BASED ON DESCRIPTORS IN A MULTI-DIMENSIONAL SEARCH SPACE

TECHNICAL FIELD

Aspects described relate generally to providing a purchase recommendation in response to search criteria and purchase history.

BACKGROUND

An item can be described in innumerable ways, for example, by part number, use, size, color, smell, style, dimensions, whether it is gender specific, whether it requires assembly, etc. Such characteristics can be used to find correlations between items, or past purchases of items, that could be used to provide suggestions to a person to purchase items in the future. However, simple comparisons between these properties may provide only minimally useful results. For example, if a person performs a web search for "candles," the search engine may provide options for buying a random selection of candles (e.g., birthday cake candles, tapered candles, scented candles, etc.) because of a simple word match between the searched term and the search results. Moreover, the results may include items that are available only from large box stores that have a substantial online presence. Such results may not focus on the item the user intended to find or include stores at which the user prefers to shop.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein include methods and systems that provide new capabilities for providing purchase recommendations to a user based on the user's past purchasing history and the purchase history of others. A new descriptor referred to as "purchase embeddings" is disclosed, which are data records in a new multi-dimensional space for representing, describing and tracking purchases of goods and services. Various aspects involve the compilation and structure of purchase embeddings in a database, updating purchase embedding records based on continued monitoring of purchases, identifying correlations between different purchases based on calculating distances between purchase embeddings, and providing shopping recommendations based on those correlations.

Purchase embeddings may be based on basic descriptions of items, an individual's past buying history, other's purchasing history, regional differences in shopping habits, etc. Various aspects include methods for discovering combinations of these characteristics that indicate a relationship between two products, which though not readily apparent, provides some indication that if a person was interested in buying one of the products, they would also be interested in buying the other product. Various aspects include synthesizing these factors and combinations of factors into the purchase embedding space such that measures of similarity may be calculated between two items (or a group of items) by calculating a distance between the purchase embeddings that represent the respective items.

Using purchase embeddings, for example, a buyer's search for "candles" may return buying options for purchasing scented candles and incense. This suggestion may be based on the buyer's past purchase history indicating a pattern of shopping for air deodorizers. Purchase embedding enable correlations to be drawn between scented candles and air deodorizers because they provide the same effect of emitting a scent, and by extension draw a correlation to incense, which like scented candles, are burned to provide the scent.

In various aspects, the purchase embedding is a tuple (e.g., coordinates of a vector) defined in the multi-dimensional description space, where each dimension (and element of the tuple), includes a range of values that provide a measure of some characteristic (or combination of characteristics) of an item. How similar two items are with respect to that characteristic (or combination of characteristics) can be calculated by the difference between values for that dimension of the respective purchase embeddings. Because the purchase embedding space is multi-dimensional, multiple different characteristics (or combination of characteristics) can be simultaneously considered, with the difference (or distance) between two purchase embedding providing a measure of similarity that has both magnitude and direction.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIG. 6 depicts an example data structure of search results from a query of a purchase embedding record database.

DETAILED DESCRIPTION

Figure 1:
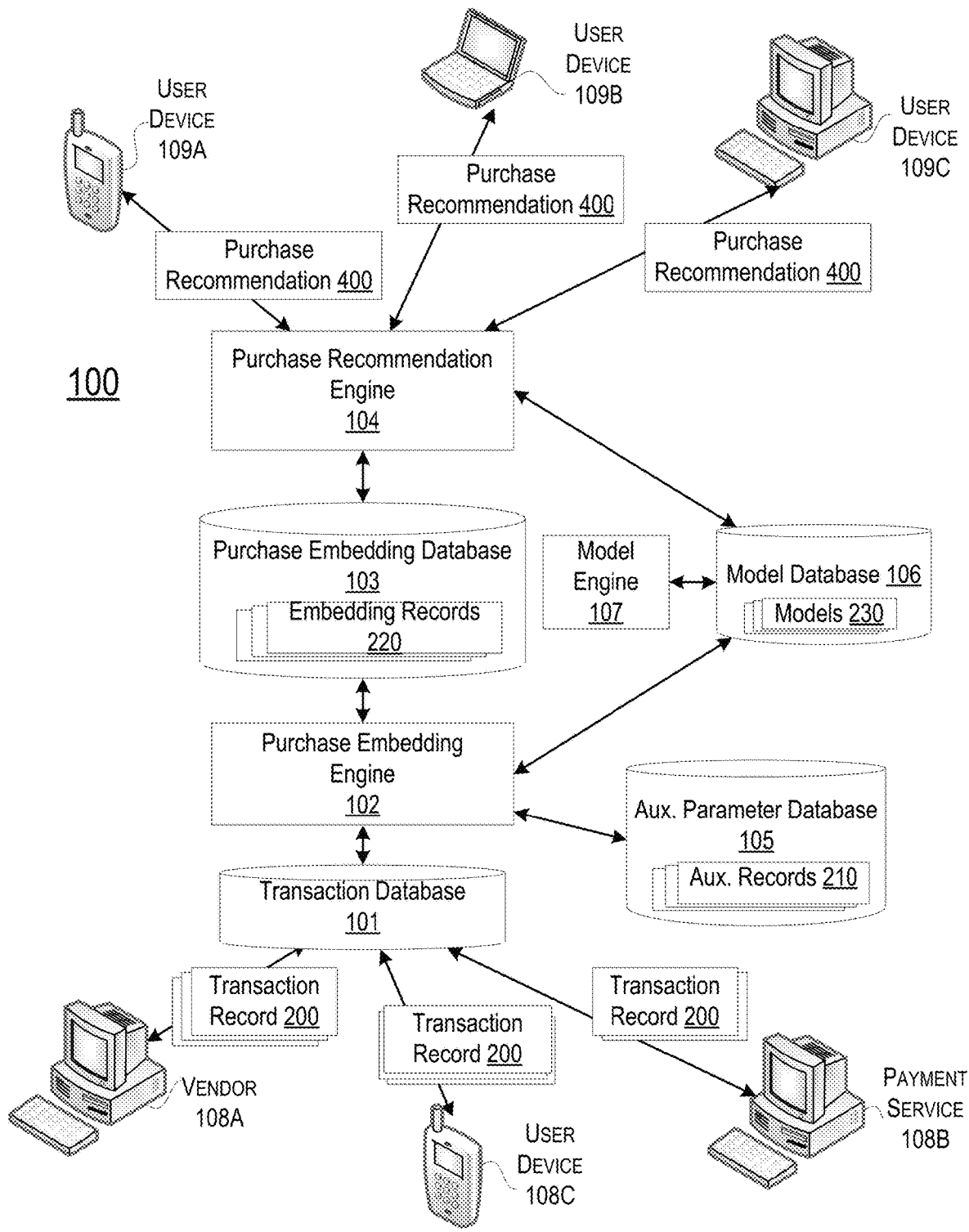
FIG. 1 depicts a block diagram of an example framework that provides purchase recommendations based on past purchase transaction records.

In the following description of the various embodiments, reference is made to the accompanying drawings, which form a part hereof, and in which is shown by way of illustrating various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting.

Methods and systems described herein provide new capabilities for providing purchase recommendations to a user based consumer pattern behavior, such as a user's past purchasing history and the purchase history of others. The recommendations utilize "purchase embeddings," which are data records in a new multi-dimensional space for representing, describing and tracking purchases of goods and services. Various aspects involve the compilation and structure of purchase embeddings in a database, updating purchase embedding records based on continued monitoring of purchases, identifying correlations between different purchases based on calculating distances between purchase embeddings, and providing shopping recommendations based on those correlations.

An item can be described in innumerable ways, such as by part number, use, size, color, smell, style, dimensions, whether it is perishable, whether it is gender specific, whether it requires assembly, whether it is known by different names in different geographical regions, etc. An item can also be described by how it is bought and sold. For example, an item can be characterized by vendors that sell the item, by particular people that buy the item, geographic regions in which sales occur, cost for the item, dates and times of day the item is bought/sold, quantities in which item is bought/sold, etc. All of these characteristics can be used to find correlations between items, or past purchases of items, that could be used to provide suggestions to a person to purchase items in the future. However, simple comparisons between these properties may provide only minimally useful results. For example, if a person buys a pack of gum each week, that purchase history could be used to suggest (e.g., in an advertisement) to buy the same pack of gum in the future. As another example, if a person performs a web search for "candles," the search engine may provide options for buying a random selection of candles (e.g., birthday cake candles, tapered candles, scented candles, etc.) from major brands and vendors with a large on-line presence.

Purchase embeddings go beyond such simple word matching by characterizing the items in a new multi-dimensional search space (a "purchase embedding space"). In addition to considering basic descriptions of items, several other factors are considered, including an individual's past buying history, other's purchasing history, regional differences in shopping habits, etc. Not only are individual characteristics considered, but the process discovers (e.g., using a machine learning model) combinations of these characteristics that indicate some relationship between two products, which though may not be readily apparent, indicates some similarity suggesting that if a person was interested in buying one of the products, they would also be interested in buying the other product. These factors and combinations of factors are synthesized into the purchase embedding space such that measures of similarity may be calculated between two items (or a group of items) by calculating a distance between the purchase embeddings representing the respective items.

More specifically, a purchase embedding is a tuple (e.g., coordinates of a vector) defined in the multi-dimensional description space, where each dimension (and element of the tuple), includes a range of values that provide a measure of some characteristic (or combination of characteristics) of an item. How similar two items are with respect to that characteristic (or combination of characteristics) can be calculated by the difference between values for that dimension of the respective purchase embeddings. Because the purchase embedding space is multi-dimensional, multiple different characteristics (or combination of characteristics) can be simultaneously considered, with the difference (or distance) between two purchase embedding providing a measure of similarity that has both magnitude and direction.

A dimension may correlate directly to a single parameter of an item (e.g., clothing size), but a dimension may also be a measure of some amalgamation of parameters (e.g., parameters describing the item, parameters characterizing how the item is bought or sold, an individual's or group's purchase habits, etc.) that are learned through analysis of purchase histories or inputted by a person. The elements may or may not be statistically independent. Further, purchase embeddings are not limited to tuples where each element have the same range or type of values. A purchase embedding may comprise a set of elements that, for example, could be defined by range of integer values (e.g., −10 to +10), a real valued number from 0 to 1 (e.g., 0.567), a binary value (e.g., 0 or 1, yes or no), a set of categories (e.g., formal, casual, business-casual), etc. When, the dimensions are created through a machine learning process, the parameters that go into defining a dimension may not be easily discernable.

For example, with purchase embeddings, a buyer's search for "candles" may return buying options for scented candles and incense from local vendors within a specific geographical region. This suggestion may be based on the buyer's past purchase history or search history that indicates a pattern of shopping for air deodorizers at local stores in the specific geographical region. Though not obvious upon first examination, purchase embedding enable correlations to be drawn between scented candles and air deodorizers because they provide the same effect of emitting a scent, and by extension draw a correlation to incense, which like scented candles, are burned to provide the scent. The ability to derive a preference for local vendors over big box stores, and to determine which local vendors stock the recommended products is another capability that results from using purchase embeddings and the disclosed system.

As another example, a buyer may have a particular shopping pattern of purchasing a "DC Lottery" ticket, a sugar donut, and soft serve ice cream every Monday around 12:00 pm within a particular one mile region in Washington, DC. Though the items themselves may be generally unrelated, purchase embeddings may be used to recommend a similar purchasing pattern in a different geographic region. For example, if the buyer is traveling in Burlington, Vermont on a Monday, purchase embeddings would enable a recommendation (e.g., from an application on the user's mobile phone) for a similar one mile route in Vermont to purchase a "Vermont Lottery" ticket, a cider donut, and a "creemee" (local name for soft serve ice cream), so that the buyer can duplicate their customary pattern. Here, utilizing purchase embeddings, three different factors may be considered (ether individually or in combination): 1) the similarity between the previously bought items respectively to the recommended items; 2) the purchase pattern of the purchased items by the buyer; and/or 3) the similarity (or dissimilarity)

of the purchased items to each other. With respect to the first relationship, one or more elements of the purchase embeddings would reflect the likeness (e.g., based on a minimum distance between the purchase embeddings) between the previously purchased items respectively to their comparable recommended items based on parameters that describe the items themselves. Though the names of the items are different (e.g., soft serve versus creemee), other characteristics of the items enable the system to identify that the items are nonetheless essentially the same or similar things. With respect to the second relationship, one or more elements of the purchase embedding would reflect the likeness between how the previously purchased items are bought/sold to how the recommended items are bought/sold. Here characteristics such as time of day of the purchases, sequence of making the purchases, repetition of the purchases, and geographic locations are taken into account. With respect to the third relationship, distance and vector relationships (e.g., vector magnitude and/or direction) in the embedding space between the three purchased items may be compared to and duplicated within some threshold to distance relationships between the three recommended items. As compared to finding the shortest distance between purchase embeddings for finding the most similar items, the purchase embeddings are used to find, for example, that the three previously purchased items compare to each other in the same way as the three suggested items. While different elements of a purchase embedding may be a measure of any one of these factors, a purchase embedding element may reflect any combination of these factors.

How well these purchase recommendations match the buyer's intent can be measured, for example, by whether the recommended items are ultimately bought or by asking/polling the buyer about how useful the recommendation was. Such measurements can then be used to further refine the purchase embedding space and purchase embeddings themselves.

FIG. 1 depicts a block diagram of an example system 100 for generating purchase embeddings from purchase transaction records and for providing purchase recommendations from those embeddings. Starting at the bottom of the figure, the example system 100 illustrates a number of sources of transaction records 200, which are detailed records (e.g., a receipt) of a sale of a particular item. For example, a vendor, which is indicated as computer device 108A, may generate transaction records through a payment processor or inventory management software that provides details (e.g., item name, cost, purchase method, remaining stock, etc.) of individual purchase transaction.

Another source of transaction records may include a payment or financial service or system, identified as computer device 108B, such as a credit card company, online payment service (e.g., companies such as CAPITAL ONE, PAYPAL, VENMO, WESTERN UNION, etc.). When using the payment or financial service/system for payment in a transaction, details (e.g., cost, vendor, item description) may be collected to generate the transaction record.

A third source of transaction records 200 may be the buyers themselves, as indicated by a user's computer device 108C (e.g., mobile phone, tablet, laptop). For example, a user may utilize an accounting application run on the computer device 108C to scan (e.g., via camera) purchase receipts for items. As another example, a user may have an application (e.g., web browser plug-in) that tracks a user's purchases made online (e.g., via a vendor's website), and copies details of the transaction (e.g., from the webpage).

Each of these sources (e.g., 108A, 108B, and 108C) of transaction records 200 may communicate the records to, and store the records in, a transaction database 101.

Figure 2A:
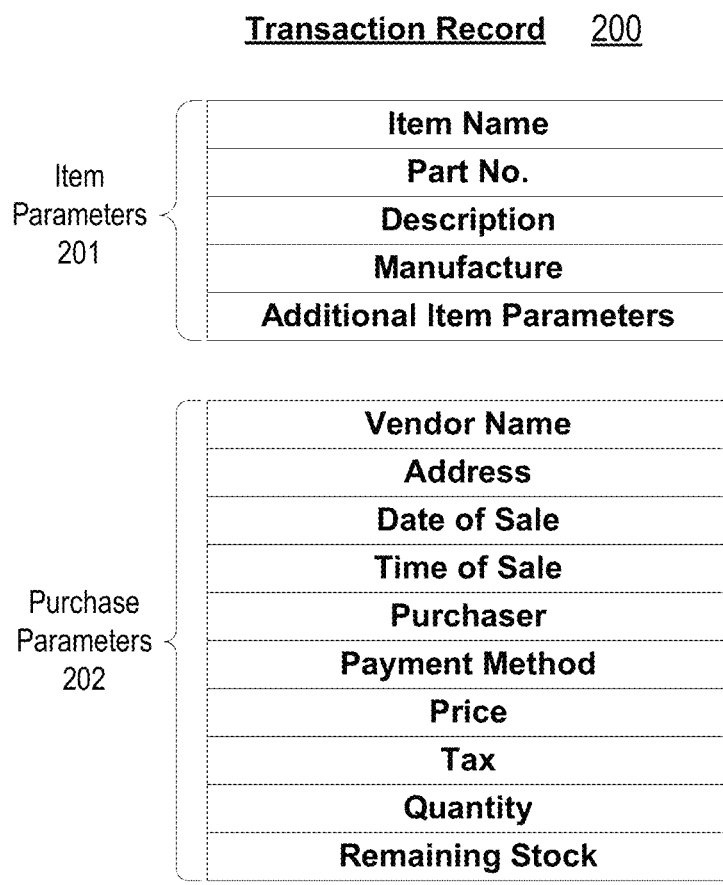
FIG. 2a depicts an example a data structure of a purchase transaction record.

FIG. 2a illustrates an example data structure for a transaction record 200. Transaction record 200 may include one or more parameters that characterize an item in some manner. As shown, some parameters, identified as item parameters 201, characterize the item itself. Examples of such parameters include an item name, a part number (e.g., Universal Product Code, a manufacture's part number, distributer's part number, or vendor's part number, etc.), a description of the item, the manufacture of the item, or any other parameter that may be used to characterize the item (e.g., size, dimensions, weight, color, smell, applications, etc.). one or more other parameters, identified as purchase parameters 202, may characterize the item by how it is bought or sold. Purchase parameters 202 may relate to the vendor, such as the vendor name, vendor address, remaining stock of the purchased item, etc. Other purchase parameters 202 may relate to the purchaser, such as the identity of the purchaser, address and/or phone number of the purchaser, payment method (e.g., credit card information) used by the purchaser, gender of the purchaser, age of the purchaser, hair color, etc. Still further parameters may relate to the particular transaction, such as the price paid for the item, date and/or time of the sale, tax paid for the item, quantity of the item that was bought, identification of other items bought together in the transaction, etc.

A particular transaction record 200 may include only a subset of item parameters 201 and/or purchase parameters 202. Moreover, multiple transaction records 200 may be generated for the same transaction, which can later be cross-correlated or combined into single transaction record in the transaction record database 101. For example, a buyer may purchase an item from a vendor using a particular credit card. For this transaction, the buyer may scan the receipt to generate a transaction record 200 that includes some of the parameters mentioned above (e.g., item name, cost, tax, vendor name, data and time of sale, identity of the purchaser). The vendor may also generate a transaction record 200 that includes a different set of parameters (e.g., item name, cost, tax, item description, date and time of sale). Further, the credit card company may also generate a transaction record 200 that includes yet a further set of parameters (e.g., purchaser identity, data and time of transaction, credit card number, total cost, personal details of the buyer, etc.). Each of the transaction records may be communicated to the transaction database 101, which may identify the transaction records as characterizing the same transaction based on common data in each record. The transaction database 101 may store these records separately, but identify them as related, or may generate a single transaction record including all of the parameters of the three separate records.

Referring back to FIG. 1, a purchase embedding engine 102, may retrieve the transaction records 200 stored in transaction database 101, and optionally retrieve other auxiliary records 210 from auxiliary parameter database 105, to generate purchase embeddings and associated purchase embedding records 220 (also referred to herein as item records). Auxiliary records 210 may include item parameters 201 and purchase parameters 202 related to an item, and have a structure, similar to the transaction record 200 discussed above with respect to FIG. 2a. Auxiliary records 210 may be used to supplement parameters in a transaction record 200. For example, if a transaction record includes a part number of an item, but no other item parameters, that part number may be used to find in the auxiliary records 210 more information about the item identified by the part number in the transaction record 200. For example, an auxiliary record 210 may include the same part number (used to match it to the transaction record) plus other item parameters describing the item.

As another example, auxiliary records 210 may be generated by a financial services company (e.g., a credit card company) and include purchase parameters, such as personal buyer information (e.g., gender, age, credit score, etc.) associated with a credit card number included in a transaction record 200.

Figure 2B:
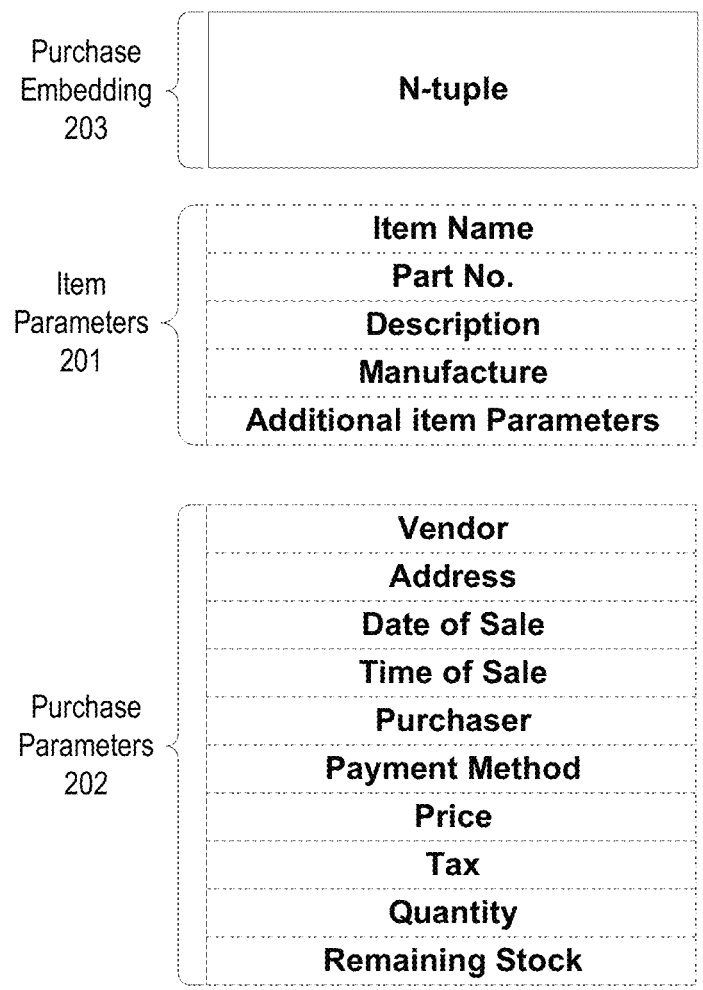
FIG. 2b depicts an example data structure of a purchase embedding record including a purchase embedding that describes the purchased item in an N-dimensional description space.

Using the transaction records 200 and optionally the auxiliary records 210, the purchase embedding engine 102 may generate purchase embedding records 220, for example, as shown in FIG. 2b. As shown in FIG. 2b, the purchase embedding record 220 includes a purchase embedding 203, which as described above, is a tuple (e.g., vector coordinates) of any number of elements greater than zero (i.e., an N-tuple, where N is a positive integer) that represents and describes an item, and/or the sale of an item, in a multi-dimensional description space. The Embedding Record 220 may optionally include one or more item parameters 201 and purchase parameters 202 of transaction records 200 and/or auxiliary records 210 from which the purchase embedding 203 was created or is associated. For example, the purchase embedding 203 may have been created from item parameters 201 only from a transaction record 200, and thus characterize only the item, while purchase parameters 202 from the transaction record 200 in the purchase embedding record may be included to associate the purchase embedding 203 with a particular transaction. The purchase embedding 203, in general, may be based on any subset of parameters associated with a transaction, with the same or additional parameters associated with a transaction also included in the purchase embedding record 220. In this way, purchase embedding records 220 provide a flexible architecture where the purchase embeddings can be compared to find related items which does not considering a particular transaction, or find related items that also consider aspects are sold by a particular vendor, purchased by a particular buyer, sold by a group of vendors (e.g., those located in a particular region), or bought by a group of individuals.

Figure 3:
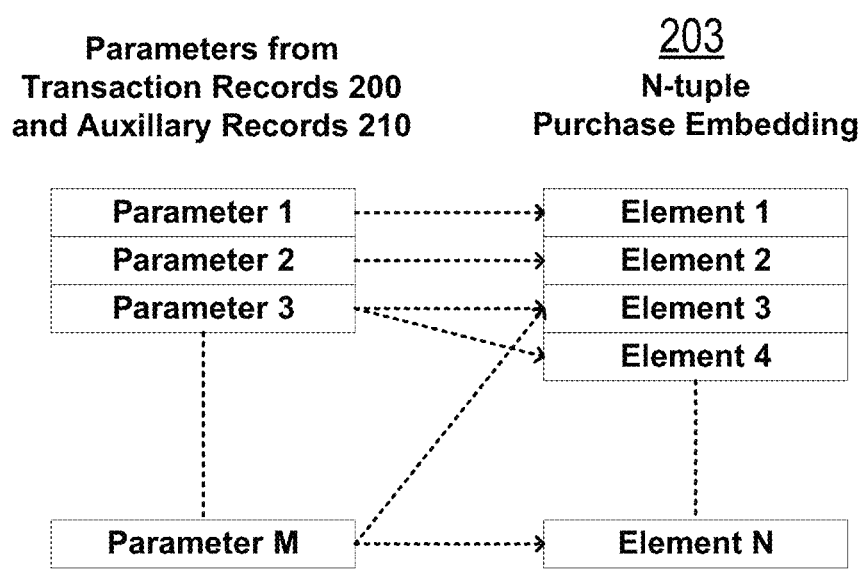
FIG. 3 depicts an example relationship between elements of a purchase embedding and parameters of a transaction record.

FIG. 3 illustrates the relationship between parameters of transaction records 200 and/or auxiliary records 210 and elements of an N-tuple purchase embedding 203. As represented by the dotted arrow lines, each element of the purchase embedding may be generated from any number and any combination of parameters, for example, as may be determined by a machine-learning model used to define the multi-dimensional embedding space.

Figure 4A:
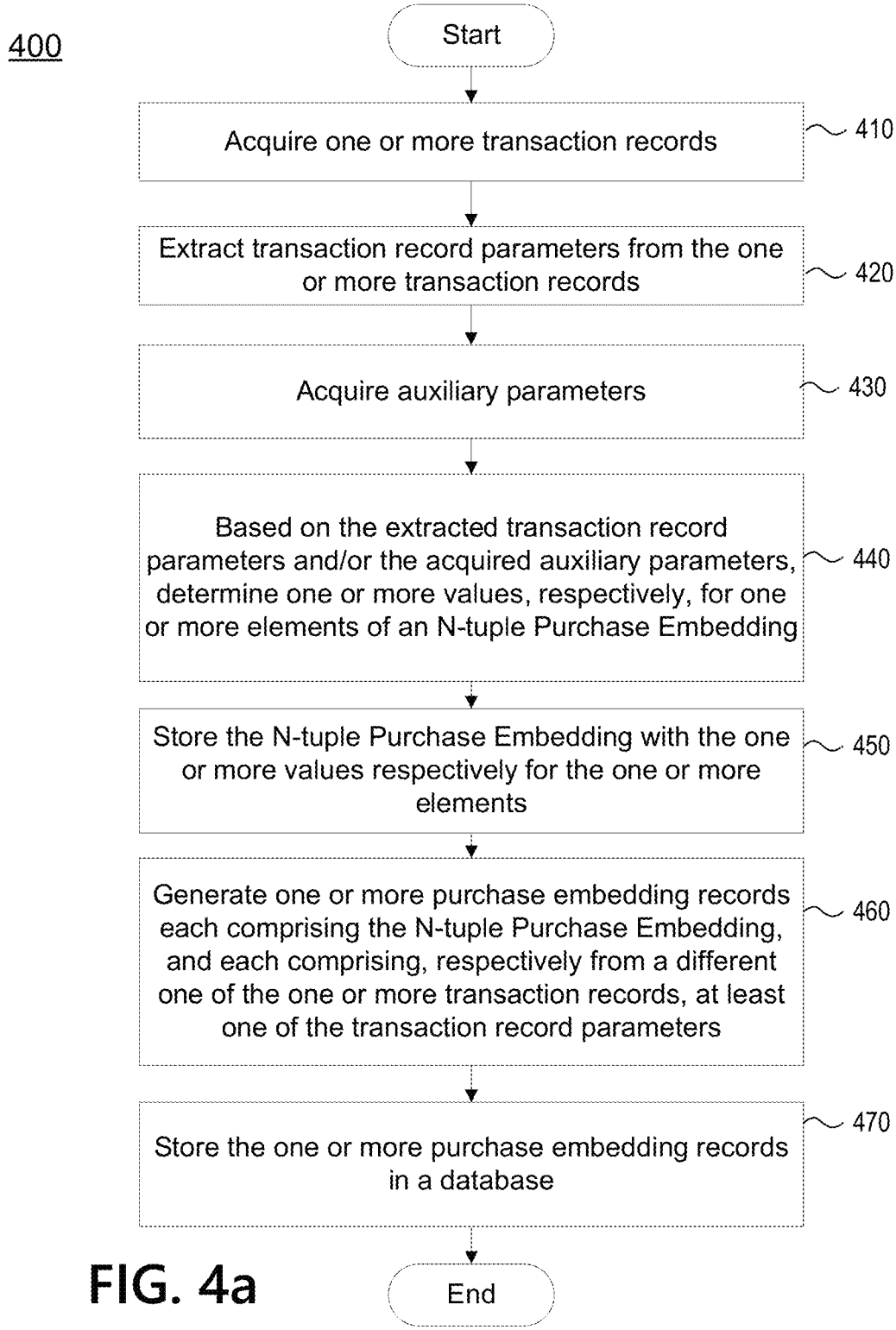
FIGS. 4a and 4b depict example methods for generating purchase embedding records from purchase transaction records.

FIG. 4a illustrates an example method 400 that may be used to generate a purchase embedding record 220. Method 400 may be implemented by one or more suitable computing devices, as described herein. For example, method 400 may be implemented by a computing device (e.g., purchase embedding engine 102 implemented with any one of computing devices 801, 805, 807, and 809 of FIG. 8), and/or combination of computing devices (e.g., a combination of purchase embedding engine 102 and any other engine or database of system 100 implemented with a combination of computing devices 801, 805, 807, and 809 of FIG. 8). Method 400 may be implemented in suitable computer-executable instructions, such as in software 827, 829, 830, and 831, and include access of a transaction database (e.g., 101), a purchase embedding database (e.g., 103), an auxiliary parameter database (e.g., 105), and/or model database (e.g., 106) as illustrated in FIG. 1.

In method 400, at step 410, one or more computing devices may acquire one or more transaction records from one or more sources. For example, the one or more computing devices may implement a transaction database (e.g., 101), and receive the transaction records from a vendor computing device 108A, a payment service 108B, and/or a user device 108C via a network (e.g., 803).

At step 420, the one or more computing devices may extract and parse transaction record parameters from the one or more transaction records. In parsing the transaction record parameters, the one or more computing devices may select a subset of the parameters used by a model (e.g., a classifier model) for generating purchase embeddings.

At step 430, the one or more computing devices may acquire auxiliary parameters. As discussed above, the acquisition of particular auxiliary parameters may include determining one or more auxiliary parameters that are associated with one or more of the transaction record parameters, and acquiring those parameters. The acquisition of particular auxiliary parameters may further based on determining which parameters are used by the model, and selecting from the auxiliary parameters, a parameter that is used by the model but that is not included in a transaction record.

At step 440, the one or more computing devices may, based on the extracted transaction record parameters and/or the acquired auxiliary parameters, determine one or more values, respectively, for one or more elements of an N-tuple purchase embedding, and subsequently generate the embedding, for example, as shown in FIG. 3 and as further detailed below with respect to FIG. 4B.

At step 450, the one or more computing devices may store the N-tuple purchase embedding with the one or more values respectively for the one or more elements. The N-tuple purchase embedding may be stored, for example, in a memory device of the one or more computing devices, or may be stored in a separate database system (e.g., 101 or 103).

At step 460, the one or more computing devices may generate one or more purchase embedding records each comprising the N-tuple Purchase Embedding generated in step 450, and each comprising, respectively from a different one of the one or more transaction records, one or more parameters from a transaction record, and optionally, one or more parameters of an auxiliary record that was retrieved in step 430.

At step 470, the one or more computing devices may store the one or more purchase embedding records in a database (e.g., 103), for example, for later use in generating search results or suggesting items to purchase by a user.

Figure 4B:
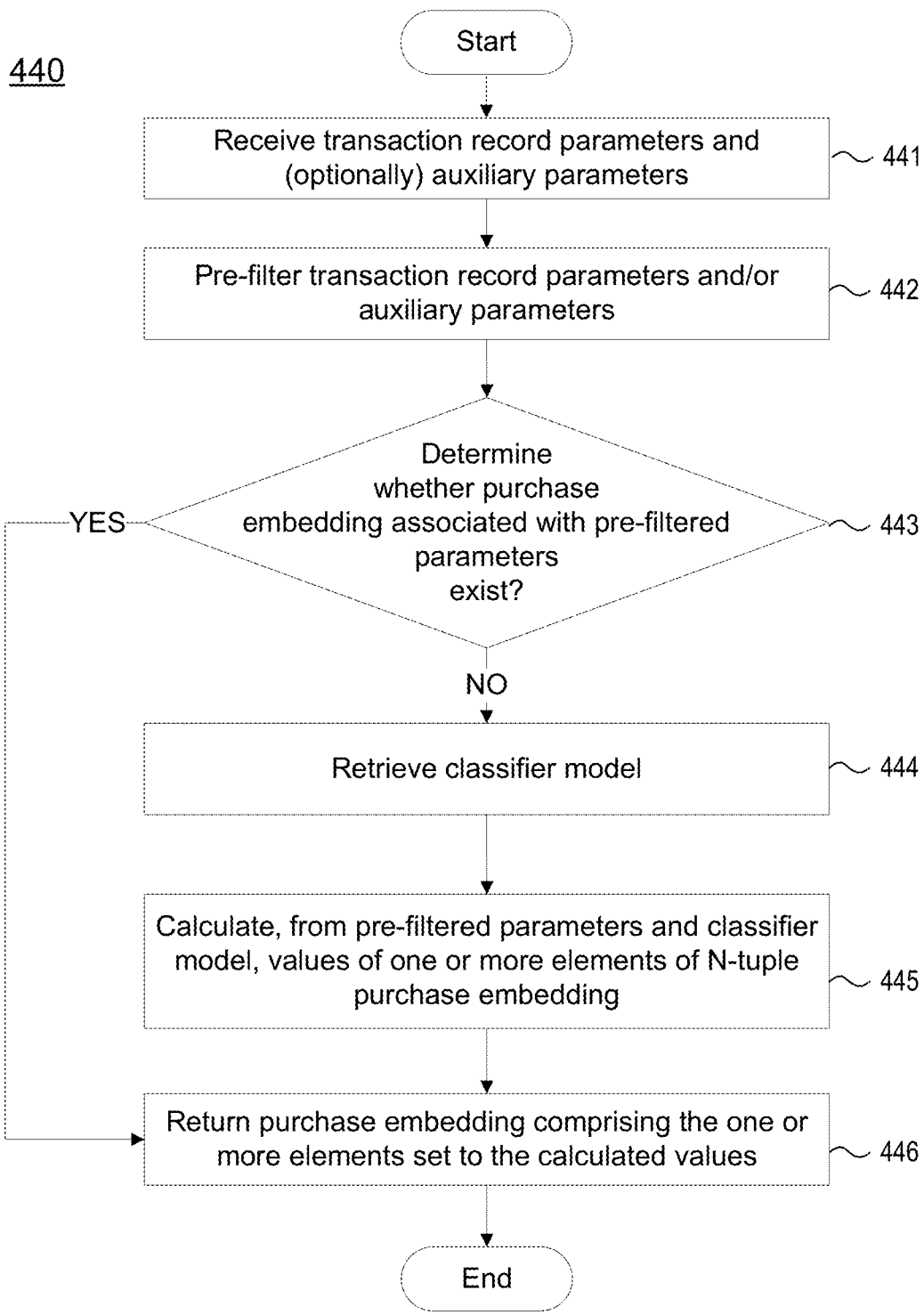

FIG. 4b illustrates a further example of steps that may be used to implement step 440 of FIG. 4a for determining values of elements of a purchase embedding. The method may begin at step 441 with the one or more computing devices receiving the transaction record parameters and (optionally) auxiliary parameters that were acquired in steps 420 and 430. At step 442, the one or more computing devices may pre-filter transaction record parameters and/or auxiliary parameters. For example, the one or more computing devices may remove purchase parameters such that generated purchase embedding are based just on items parameters which describe item itself, but do not characterize how it was bought or sold. As another example, the one or more computing devices may apply filters based on a particular parameter, such as the location of the vendor where the item associated with the parameter was sold. Such a filter may be applied, for example, to limit generating a purchase embedding for only items bought or sold within a specific geographical region. As another example, parameters characterizing the buyer may be removed such that the generated purchase embedding does not describe the user's personal information or preferences.

At step 443, the one or more computing devices may determine whether the purchase embedding associated with pre-filtered parameters exist. For example, it the parameters after filtering only include parameters for the item, and a purchase embedding exists in the database that already corresponds to those parameters, the purchase embedding can be retrieved from database rather than being newly generated. As another example, if a purchase embedding exists in the database that corresponds to the subset of parameters, the purchase embedding may be retrieved from the database and used as a starting point and modified based on the remaining filtered parameters not included in the subset. If a purchase embedding exists that corresponds to the entire set of parameters after filtering, the method proceeds to step 446, at which the one or more computers return the purchase embedding as input to step 450 in FIG. 4A. If a purchase embedding that corresponds to the entire set of parameters after filtering does not exist, method proceeds to step 444.

At step 444, the one or more computing devices may retrieve a classifier model, which uses the parameters, and optionally a partially corresponding purchase embedding, to generate values of the elements of a purchase embedding. The classifier model, for example, may be a model 230 retrieved from a model database 106 as shown in FIG. 1.

The classifier model, for example, may be a set of rules generated by a person or a machine-learning model that is trained by model engine 107 shown in FIG. 1. The one or more computing devices (e.g., model engine 107) may train a plurality of models for determining elements of the purchase embeddings based on parameters in transaction records. The plurality of models may include one or more statistical classifiers, naïve Bayes classifiers, one or more neural networks, and/or one or more other suitable machine-learning model. The training may be performed based on a supervised learning process or other suitable training process, and training set (e.g., a plurality of tuples paired with associated parameters) stored in a database (e.g., 106). Each of the plurality of models may be configured to receive, as input, one or more parameters of a transaction record and extract from those parameters, principle components in the multiple dimensions of the embedding space to provide, as output, one or more elements of a purchase embedding. How well the models lead to purchase recommendations match the buyer's intent can be measured, for example, by whether the recommended items are ultimately bought or by asking/polling the buyer about how useful the recommendation was. Such measurements can then be used to further train the models.

At step 445, the one or more computing devices may calculate, from pre-filtered parameters and the classifier model, values of one or more elements of N-tuple purchase embedding. Values for every element or only a subset of the elements of the purchase embedding may be generated with the model. The process then proceeds to step 446, at which the purchase embedding is generated comprising the one or more elements set to the calculated values, and optionally with default or no values for elements for which the model did not calculate a value. The generated purchase embedding is then returned as input to step 450 in FIG. 4a.

Returning to system 100 illustrated in FIG. 1, from the purchase embedding records 220 stored in database 103, a purchase recommendation engine 104 may generate purchase recommendations 400 that are communicated to user devices, which are identified as computing devices 109A, 109B, and 109C (e.g., mobile phone, tablet computer, laptop computer, desktop computer, etc.).

The purchase recommendation engine 104 may generate the recommendations based on the purchase embedding records alone. For example, the purchase embedding records may be analyzed by engine 104 to identify purchase histories by particular buyers (either from purchase parameters 201 and/or 202 as shown in FIG. 2b, of from the purchase embedding 203 that is generated from the parameters), and then compare (e.g., by calculating a distance) the purchase embeddings of those parameters associated with the particular buyer to the purchase embeddings of other purchase embedding records in the database to identify similar items to items the user previously bought. Not only can the comparison determine items that are similar based on the purchase embeddings, but can also (or alternatively) determine items that are similar in other respects, such as being bought within a common geographic area, being bought with other similar items, being bought at a common time of day, etc.

The purchase recommendation engine 104 may also generate the recommendations based on search queries received from the user devices 109A-C. For example, a search query can include a number of parameters, that like transaction record parameters, can be used (for example, with a classifier model) to generate an embedding. An embedding created from search query parameters is referred to herein as a search embedding, which can be compared to purchase embeddings in the stored purchase embedding records to find items that match the search query.

The purchase recommendation engine 103 may also generate recommendations based on a combination of a search query and previously stored transaction records (e.g., that identify a user's purchase history). For example, a search embedding may be generated based on a search query and purchase histories (e.g., as indicated by purchase embedding records stored in the database).

Figure 5A:
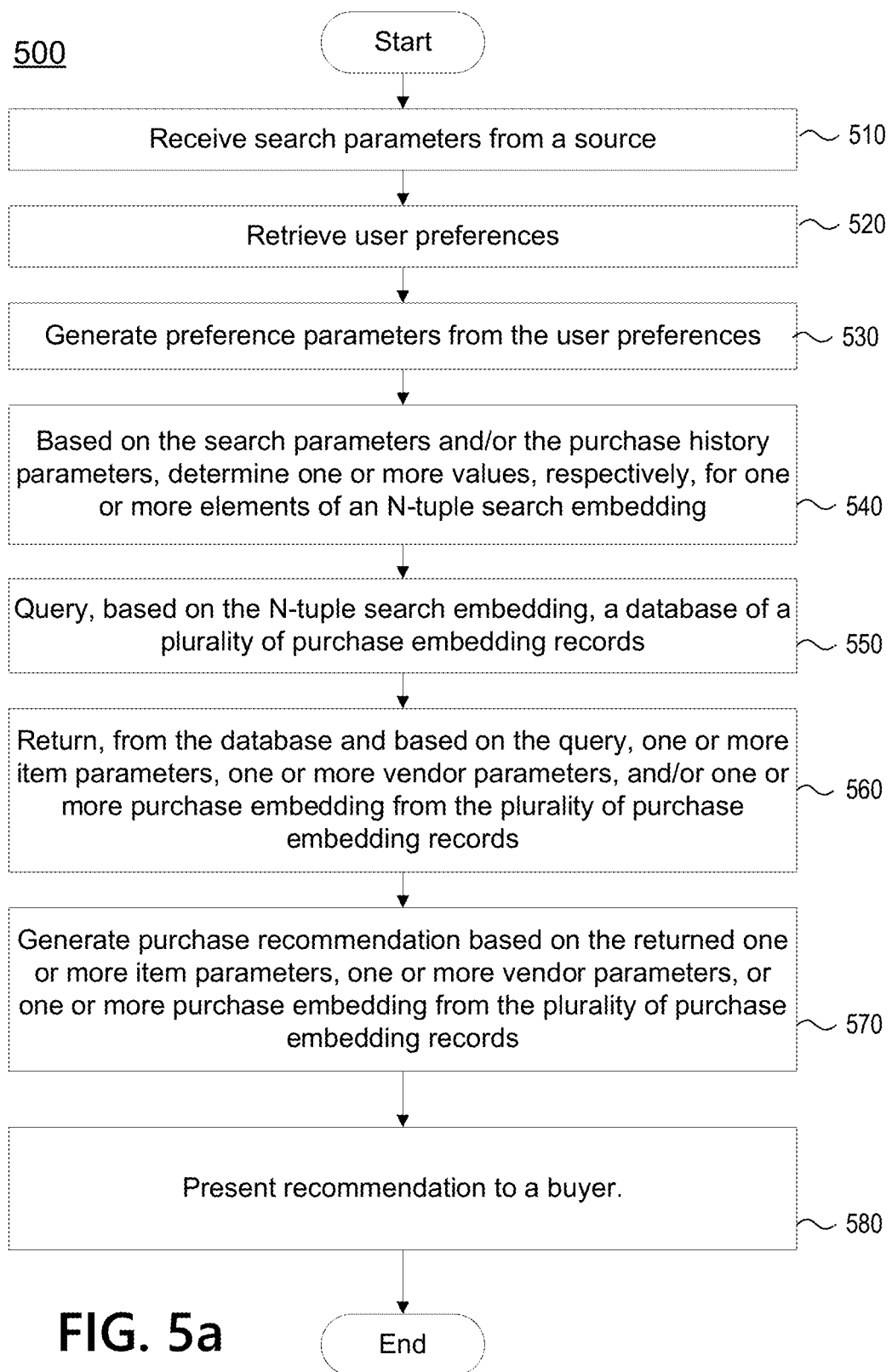
FIGS. 5a to 5c depict example methods of generating a search embedding from search parameters and querying a database of purchase embedding records based on the search embedding.

FIG. 5a illustrates an example method of generating a search embedding from search parameters and querying a database of purchase embedding records based on the search embedding. Method 500 may be implemented by one or more suitable computing devices, as described herein. For example, method 500 may be implemented by a computing device (e.g., purchase recommendation engine 104 implemented with any one of computing devices 801, 805, 807, and 809 of FIG. 8), and/or combination of computing devices (e.g., a combination of purchase recommendation engine 102 and any other engine or database of system 100 implemented with a combination of computing devices 801, 805, 807, and 809 of FIG. 8). Method 500 may be implemented in suitable computer-executable instructions, such as in software 830, 831, 833, 835 and include access of a purchase embedding database (e.g., 104), and/or model database (e.g., 106) as illustrated in FIG. 1.

In method 500, at step 510, one or more computing devices may receive search requests comprising search parameters from another computing device (e.g. a user's smart phone). For example, the one or more computing devices implementing the method may be configured as purchase recommendation engine 104, which receives search parameters from user devices 109A-C in FIG. 1.

At step 520, the one or more computing devices may retrieve a user's preferences, which may include a purchase history of the user. As discussed above, purchase history information of a particular user may obtained, for example, from purchase embedding records (e.g., 220) or transaction records (e.g., 210) stored in a database (e.g., 101, 103). The retrieval of the preferences (e.g. purchase history) of a particular user may include identifying the user from information in the search query, and using that information to filter the transaction records or purchase embedding records to only those related to the particular user. Preference information may also be received from user devices (e.g., 109A-C). The retrieval of the user preferences may also comprise querying a database for embedding records that include information related to the particular user, and for example, identifying a cluster (e.g., items defined by certain area or ranges of the dimensions in the search space, as further described below) that includes the embedding records related to the particular user.

At step 530, the one or more computing devices may generate preference parameters (e.g., purchase history parameters) from the user's preferences. The generation of particular preference parameters may include determining one or more purchase history parameters that are associated with the search parameters received in the query. The particular search history parameters may further based on determining which parameters are used by the model for generating a search embedding.

While all steps are optional, we call attention to the fact that steps 510, 520, and 530 need to be performed. For example, the remaining steps may be based on search parameters received in step 510 or based on purchase history parameters received in steps 510 and 530.

At step 540, the one or more computing devices may, based on the search parameters and/or the purchase history parameters, determine one or more values, respectively, for one or more elements of an N-tuple search embedding, and subsequently generate the search embedding, as further detailed below with respect to FIG. 5b. If the user preferences are in the form of purchase embedding records associated with the user as described above with respect to step 520, the search embedding may be selected from within a cluster that includes the purchase embedding in the records associated with the user. For example, the search embedding may be a tuple at the mathematical center of the cluster or the mathematical center of a polygon in which the purchase embedding in the records associated with the user define the vertices of the polygon.

At step 550, the one or more computing devices may, based on the N-tuple search embedding, query a database of a plurality of purchase embedding records. For example, the N-tuple search embedding may be sent to the database (e.g., 103) to perform a comparison between the search embedding and the plurality of purchase embedding records. As another example, the purchase recommendation engine 104 may retrieve the plurality of purchase embedding records from the database (e.g., 103), and perform a comparison between the search embedding and the plurality of purchase embedding records.

At step 560, the one or more computing devices may, based on the query, return, from the database or purchase recommendation engine, one or more item parameters, one or more vendor parameters, and one or more purchase embedding from the plurality of purchase embedding records. An example of how step 560 may be performed may be detailed below with respect to FIG. 5c.

At step 570, the one or more computing devise may generate a purchase recommendation (e.g., search result) based on the returned one or more item parameters, one or more vendor parameters, or one or more purchase embedding from the plurality of purchase embedding records. The recommendation may include, for example, a description of the items that are being recommended, recommend vendors and locations where items may be purchased, suggested times to purchase the items, and/or a route to travel to purchase the recommended items. The one or more computers performing step 570 may include a combination of devices, such as recommendation engine 104 and/or a user device (e.g., 109A). For example, specific items to recommend may be determined by a central server (e.g., 104) and communicated to a user device (e.g., 109), and the user device may generate a recommended list of vendors or a route to purchase the items based on the current or anticipated location of the user device (e.g., as determined by a geospatial positioning system (GPS) receiver in the user device).

At step 580, the recommendation may be presented to a buyer, e.g., the operator of user device 109A. For example, the recommendation may be presented on a display in the form of a list of items, a map identifying locations of vendors, or a route on the map to travel to purchase items.

Figure 5B:
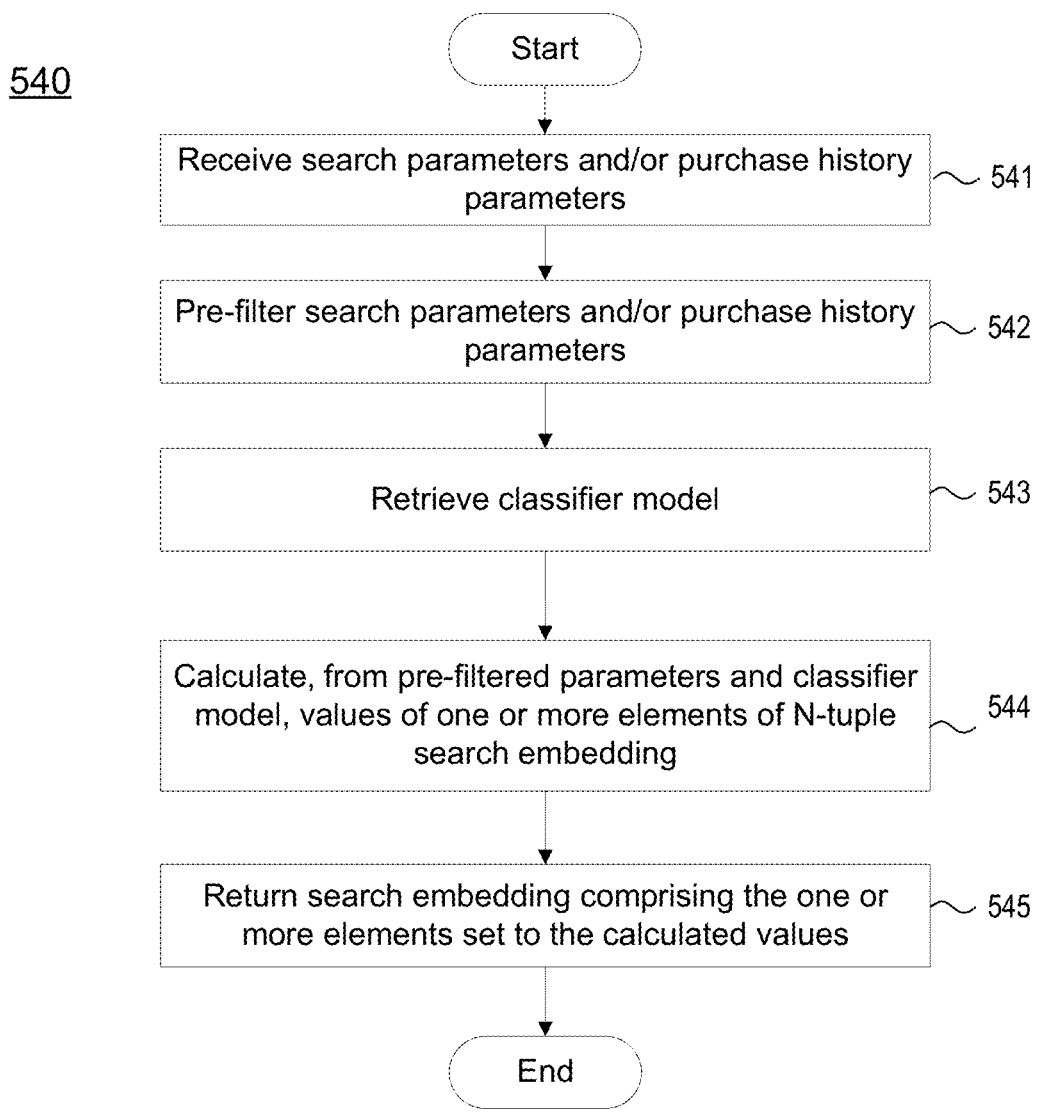

FIG. 5b illustrates an example of further steps that may be used to implement step 540 of FIG. 5a for determining values of elements of a search embedding. These further steps may begin at step 541 at which the one or more computing devices receive search parameters and/or purchase history parameters from steps 510-530 of FIG. 5a.

At step 542, the one or more computing devices may pre-filter search parameters and/or purchase history parameters. For example, the one or more computing devices may apply filters based on a particular parameter, such as the location of the vendor. Such a filter may be applied, for example, to limit searching for items sold within a specific geographical region. Other pre-filters may be applied to limit results to items sold by a specific type of vendor (e.g., small business), or items of a specific size (e.g., small or medium, but not large). As another example, parameters characterizing the buyer may be removed such that the generated search embedding does not describe the user's personal information or preferences. In applying filters, the generation of the search embedding may be based on a subset of the search parameters and/or search history parameters that meet the pre-filter criteria, and/or based on additional parameters as defined by the pre-filter criteria.

At step 543, the one or more computing devices may retrieve a classifier model for generating a search embedding that can be compared to purchase embeddings. The classifier model may use as input, the search parameters and/or purchase history parameters (either pre-filtered or not filtered). The classifier model, for example, may be a model 230 retrieved from a model database 106 as shown in FIG. 1. The classifier model, for example, may be a set of rules generated by a person or a machine-learning model (e.g., naïve Bayes classifier) that is trained by model engine 107 shown in FIG. 1. The classifier model may be the same or similar to the classifier model used to generate the purchase embeddings, or it may be one specifically generated (e.g., trained) for generating search embeddings.

At step 544, the one or more computing devices may calculate, from the parameters either pre-filtered or not filtered) and classifier model, values of one or more elements of an N-tuple search embedding. Values for every element or only a subset of the elements of the search embedding may be generated with the model.

The process then proceeds to step 445, at which the search embedding is generated comprising the one or more elements set to the calculated values, and optionally with default or no values for elements for which the model did not calculate a value. The generated search embedding is then returned as input to step 550 in FIG. 5a.

Figure 5C:
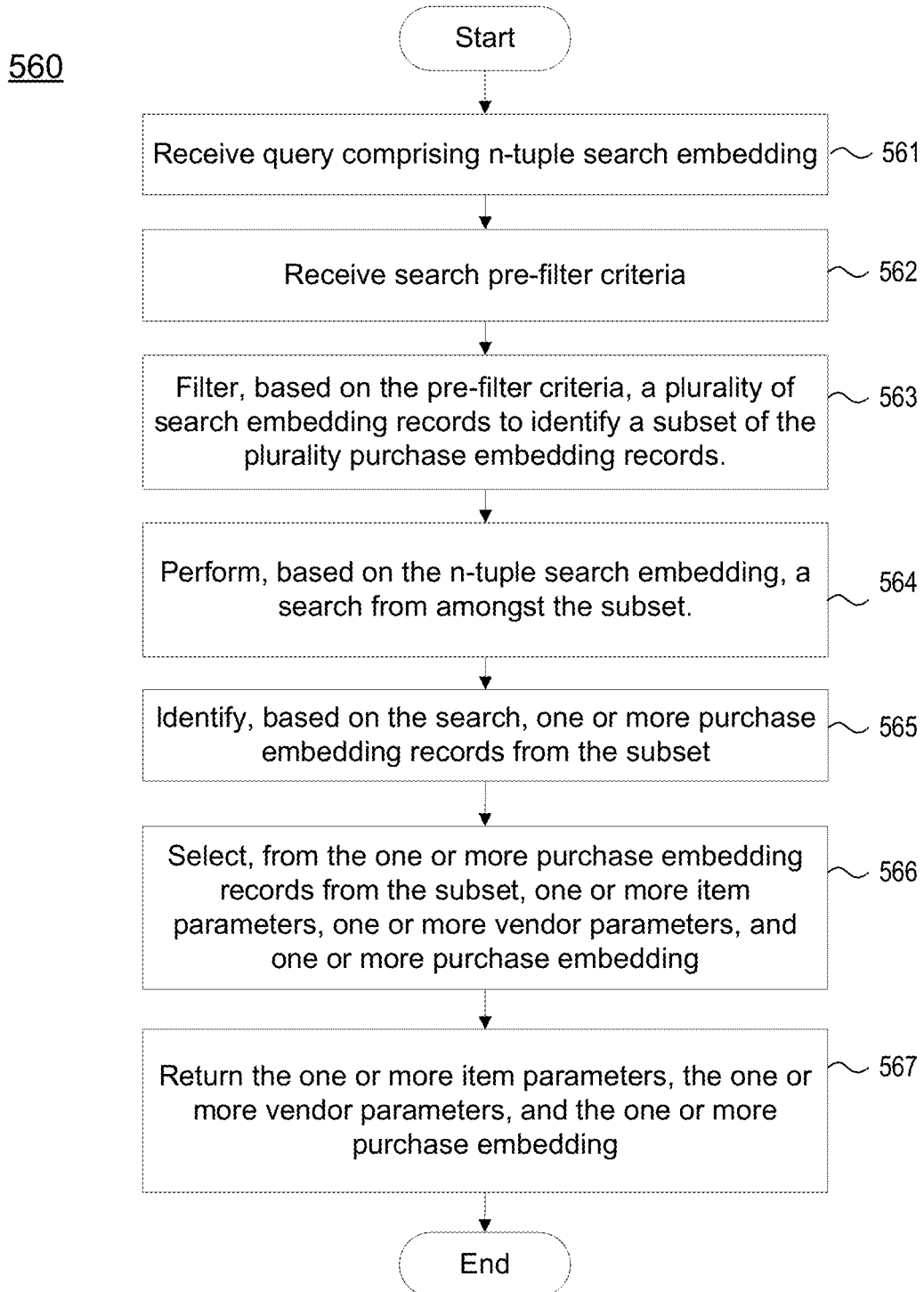

FIG. 5c illustrates an example of further steps that may be used to implement step 560 of FIG. 5a for returning search results in the form of item parameters, purchase parameters, and/or purchase embedding from purchase embedding records 220. These further steps may begin at step 561 in which the one or more computing devices may receive a query comprising n-tuple search embedding.

At step 562, the one or more computing devices may receive search pre-filter criteria. At step 563, the one or more computing devices may filter, based on the pre-filter criteria, a plurality of search embedding records to identify a subset of the plurality purchase records. For example, the one or more computing devices may apply filters based on a particular parameter, such as the location of the vendor. Such a filter may be applied, for example, to limit considering purchase embedding of only items sold within a specific geographical region. Other pre-filters may be applied to limit the purchase records searched to those of items sold by a specific type of vendor (e.g., small business), or items of a specific size (e.g., small or medium, but not large). In applying filters, the pool of purchase embedding records to consider in a query may be limited to just those that met the pre-filter criteria. For example, a pre-filter may limit the search to within a certain cluster of items (e.g., items defined by certain area or ranges of the dimensions in the embedding space). The pre-filter criteria can be applied, for example, to item or purchase parameters in the purchase embedding record, or to specific elements of a purchase embedding.

At step 564, the one or more computing devices may perform, based on the n-tuple search embedding, a search from amongst the subset. For example, the search may include a proximity search that identifies purchase embeddings that are within a predetermined distance from the search embedding. For example, the one or more computing devices may calculate the distance according to different algorithms, such as an inner product, Euclidean distance, squared Euclidean distance, Manhattan distance, Minkowski distance, Chebyshev distance, edit distance, Levenshtein distance, etc. Distance may be based on all of the dimensions (elements) in the embeddings being compared, or only a subset. Moreover, distance can be a straight distance, or a distance along a surface defined in the n-dimensional space. Distance may further be a scalar value (e.g., Euclidean distance), or a vector value (direction and magnitude), such as a vector difference between the purchase embeddings.

The search in step 564 may also (or alternatively) include searches for multiple items by matching multiple search embeddings to multiple purchase embeddings. For example, distances between the multiple search embeddings may be calculated, and a search may be conducted for multiple purchase embeddings having the same distances (within a threshold limit) between them or for multiple purchase embedding being within a cluster distance of one another. Such a search may be used, for example, to replicate a past purchasing pattern of multiple items with a similar purchasing pattern in the future.

At step 565, the one or more computing devices may select one or more purchase embedding records identified by the search. In step 566, the one or more computing devices may select from the one or more selected purchase embedding records, one or more item parameters, one or more purchase parameters, and/or one or more purchase embeddings. At step 567, the one or more computing devices may return the one or more item parameters, the one or more purchase parameters, and the one or more purchase embedding as input to step 570 of FIG. 5a.

FIG. 6 depicts an example data structure 600 of search results from a query of the purchase embedding record database 103. Data structure 600, may for example be returned as results of step 560 of FIG. 5a, or as results of step 565 or 566 of FIG. 5c. As shown in FIG. 6 as one example, the left most column includes labels of fields for the data, and the other columns are each a data record for one search result. Each data record may be a purchase embedding record or a different record having similar data. For example, each record may include information from a previous particular purchase, such as item parameters 601 (which are the same or similar to 201 of FIGS. 2a and 2b) and purchase parameters 602 (which are the same or similar to 202 of FIGS. 2a and 2b). Each record may further include a purchase embedding 603 that describes the item that corresponds to some or all of the parameters of 601 and 602. Each record may also include one or metrics 604, which are the calculated results (e.g., distances) that were produced in step 550 of FIG. 5a and/or step 565 or 566 of FIG. 5b. For example a record (column) may include a first metric (e.g., "Metric 1" having a value of "Value 1-1"), that indicates a calculated distance between the purchase embedding (e.g., "Tuple 1") of that record and the search embedding upon which the search results are based. Additional metrics (e.g., "Metric 2" having a value of "Value 2-1") in a record, may include a different calculated distances between the purchase embedding and search embedding based on a different distance algorithm. Further metrics (e.g., "Metric 3" having a value of "Value 3-1") may include calculated distances between the purchase embeddings of the multiple returned records (e.g., between "tuple 1" and "tuple 2").

Figure 7:
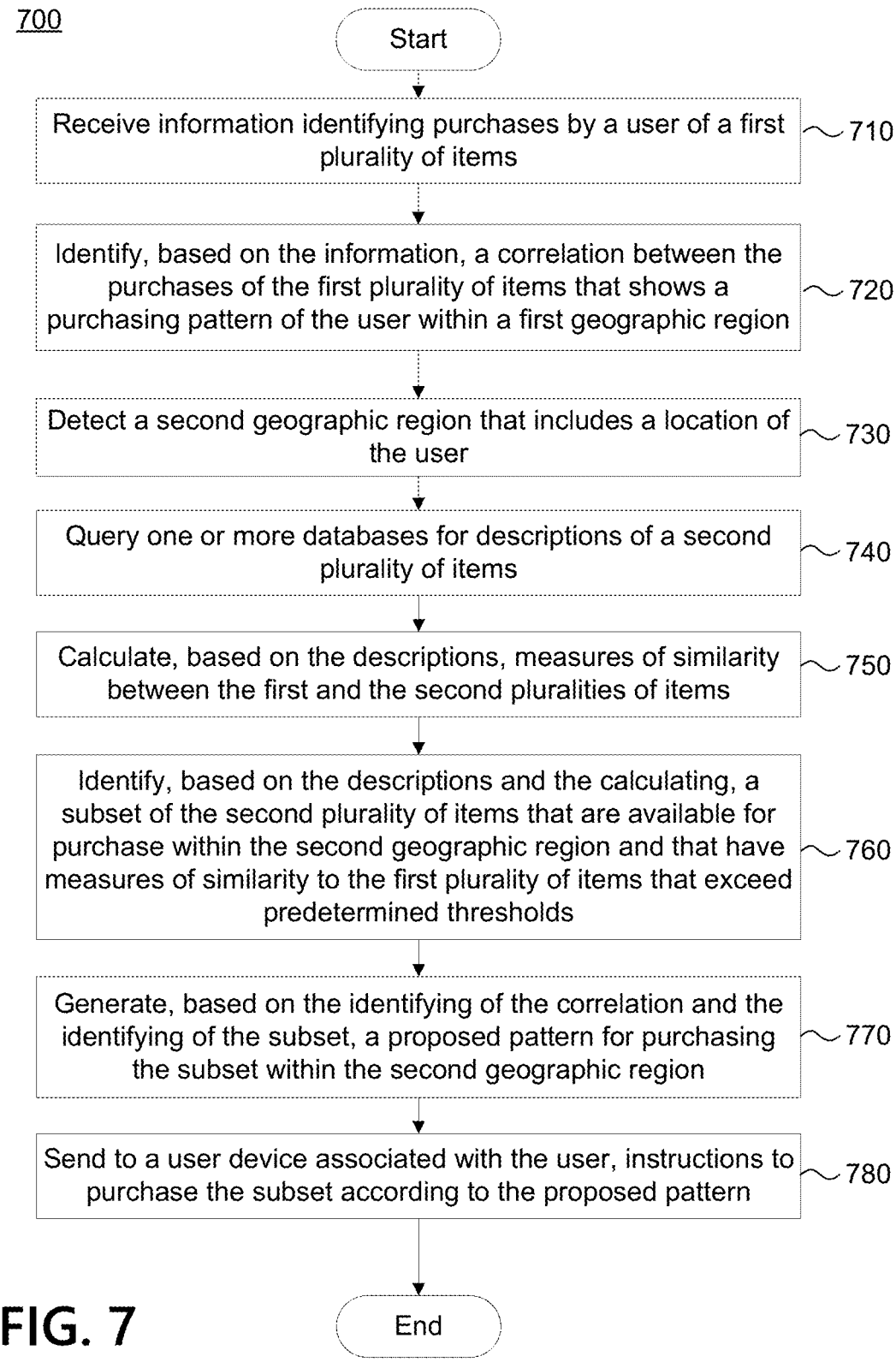
FIG. 7 depicts an example method of recommending a plurality of items to purchase based on a user's past purchase history and current geographical location.

FIG. 7 depicts an example method 700 of recommending a plurality of items to purchase based on a user's past purchase history and current geographical location. Method 700 may, for example, be implemented with a combination of system components, method steps, and data structures as described herein with respect to FIGS. 1, 2a, 2b, 3, 4a, 4b, 5a, 5b, 5c, and 7.

Method 700 may be implemented by one or more suitable computing devices, as described herein. For example, method 700 may be implemented by a computing device (e.g., purchase recommendation engine 104 implemented with any one of computing devices 801, 805, 807, and 809 of FIG. 8), and/or combination of computing devices (e.g., a combination of purchase recommendation engine 102 and any other engine or database of system 100 implemented with a combination of computing devices 801, 805, 807, and 809 of FIG. 8). Method 700 may be implemented in suitable computer-executable instructions, such as in software 830, 831, 833, 835 and include access of a purchase embedding database (e.g., 104), and/or model database (e.g., 106) as illustrated in FIG. 1.

In method 700, at step 710, one or more computing devices may receive information identifying purchases by a user of a first plurality of items. This may include, for example, the one or more computers receiving transaction records (e.g., 200) from sources (e.g., 108A-C as described above) and storing the transaction records in a database (e.g., 101), or receiving purchase embedding records (e.g., 220) from a source (e.g., database 103 or engine 104).

At step 720, the one or more computing devices may identify, based on the information, a correlation between the purchases of the first plurality of items that shows a purchasing pattern of the user within a first geographic region. This may include, for example, the one or more computers (e.g., 102 or 104) analyzing transaction records and identifying a subset of those records that include purchase parameters (e.g., 202) that identify a common purchaser, vendor addresses within the first geographic region, and ranges of dates and times of sales within which purchases occurred. This step may alternatively or additionally include analyzing purchase embedding (e.g., 203, 603) (e.g., generated from the transaction records) that include one or more elements that indicate the same type of purchaser, location, and time information, and calculating distances or other metrics between the purchase embeddings that indicate a purchasing pattern (e.g., items purchase within a specific time window, in a specific order, within a specific distance, at a common frequency, etc.). The correlation between the purchases of the first plurality of items may, for example, be based on a common class of goods or services of two of the first plurality of items, distances traveled for the purchases of the first plurality of items, amounts paid for the purchases of the first plurality of items, geographic areas where the purchases of the first plurality of items occurred, time frames when the purchases of the first plurality of items occurred, frequencies of repeated purchases of the first plurality of items, durations between two of the purchases of the first plurality of items, distances between where the purchases of the first plurality of items occurred, or methods of payment for the purchases of the first plurality of items.

At step 730, the one or more computing devices may detect a second geographic region that includes a location of the user. Step 730 may include, for example, a user device (e.g., 109A-C) identifying the second geographic region as a current location using a geospatial GPS receiver in the user device). As another example, an application running on the user device (e.g., 109A-C) may maintain a calendar and identify a future location the user is scheduled to be at on a specific date and/or time.

At step 740, the one or more computing devices may query one or more databases for descriptions of a second plurality of items. For example, the one or more computing devices (e.g., purchase recommendation engine 104) receiving purchase embeddings of the second plurality of items from storage device (e.g., purchase embedding database 103).

At step 750, the one or more computing devices may calculate, based on the descriptions, measures of similarity between the first and the second pluralities of items. For example, the one or more computing devices (e.g., purchase recommendation engine 104) may compute distance measurements (e.g., vector difference, Euclidean distance) between purchase embeddings of an item in the first plurality and an item in the second plurality. At step 750, the one or more computing devices may further determine the measures of the similarity between the first and the second pluralities of items based on computing distance measurements between different items of the first plurality of items, and/or computing distance measurements between different items of the second plurality of items.

At step 760, the one or more computing devices may identify, based on the descriptions and the calculating of step 750, a subset of the second plurality of items that are available for purchase within the second geographic region and that have measures of similarity to the first plurality of items that exceed predetermined thresholds. For example, the one or more computers (e.g., 104) may determine that the measures of similarity are each above one or more predetermined similarity thresholds (e.g., that distances between the purchase embeddings are less than one or more predetermined distance thresholds). The one or more computers may also rank the measures of similarity between the first and the second pluralities of items, and the predetermined thresholds include a predetermined minimum ranking.

Step 760 may further include the one or more computers (e.g., 102 or 104) analyzing transaction and/or purchase embedding records and identifying a subset of those records that include parameters (e.g., 202) identifying vendor addresses or other location information within the second geographic region, and optionally, identifying that the second plurality of items are for sale are within a predetermined distance from one another and/or within a predetermined distance of a location of the user within the second geographic region. This step may alternatively or additionally include analyzing purchase embedding (e.g., 203, 603) of the second plurality of items to determine that these items are for sale within the second geographic region.

At step 770, the one or more computing devices (e.g., 104, 109A-C) may generate, based on the identifying of the correlation between the purchases of the first plurality of items and the identifying of the subset of the second plurality of items, a proposed pattern for purchasing the subset within the second geographic region. For example, the one or more computers may identify an ordered list of vendors and locations where the subset of items are sold, a sequence to purchase the subset of items, suggested times frames to purchase the subset of items, and/or a route to travel between the vendors to purchase the subset of items. The one or more computers may include a combination of devices, such as recommendation engine 104 and/or a user device (e.g., 109A). For example, specific items to recommend within the second geographical region may be determined by a central server (e.g., 104) and communicated to a user device (e.g., 109), and the user device may generate a recommended list of vendors or a route to purchase the items within the second geographical region, and optionally based on the current or anticipated location of the user device (e.g., as determined by a geospatial positioning system (GPS) receiver in the user device).

At step 770, the one or more computing devices may identify a possible location where one item in the subset may be purchased, and selecting, based on one or more criteria, the possible location as one of the one or more vendor locations. The criteria may include the possible location being identified as a small business, a toll road being excluded in a route to the possible location, the possible location being within a predefined distance to the location of the user, the possible location being within a predefined distance to another one of the one or more vendor locations, or the possible location being identical to another one of the one or more vendor locations. The criteria may further include a user preference (e.g., as indicated via user device 109A-C).

At step 770, the one or more computing devices may further compare the proposed pattern to the purchasing pattern, and based on the comparison, evaluate the proposed pattern according to one or more metrics, wherein the sending of the instructions to the user device is based on the proposed pattern exceeding a predetermined rating according to the one or more metrics. The predetermined rating may indicate a travel time, a travel distance, a purchase cost, or a sales tax being lower for the subset than for the first plurality of items.

At step 780, the one or more computing devices may send to a user device associated with the user, instructions to purchase the subset according to the proposed pattern. The instructions may be presented to a buyer, e.g., the operator of user device 109A, on a display in the form of a list of items, a schedule, travel route directions, or a map identifying locations of vendors, and/or a route on the map to travel to purchase items.

While the system and methods illustrate with respect to FIG. 1, 2a, 2b, 3, 4a-b, 5a-c, 6, and 7 have been divided into separate components performing functions in a particular order, any function or component can be embodied and performed by the same device and in different order. For example, referring to FIG. 1, the transaction and purchase embeddings database 101 and 103 may be one in the same storing transaction records 200 and purchase embeddings together. Purchase embedding records 220 as shown in FIG. 2b may include a purchase embedding 203 and be associated in the database to a particular transaction record 200, instead of the purchase embedding record including items parameters 201 or purchase parameters 202 copied from the transaction record. Further, rather than generating purchase embeddings beforehand and/or independent of generating recommendations, purchase embeddings may be generated by the purchase embedding engine 102 based on, as part of, and/or in response to the purchase recommendation engine 104 initiating the generation of a purchase recommendation. For example, the pre-filters applied in FIGS. 5a-c may be applied parameters in transaction records to narrow the search space, and purchase embeddings then generated for a reduced set of filtered transaction records.

Figure 8:
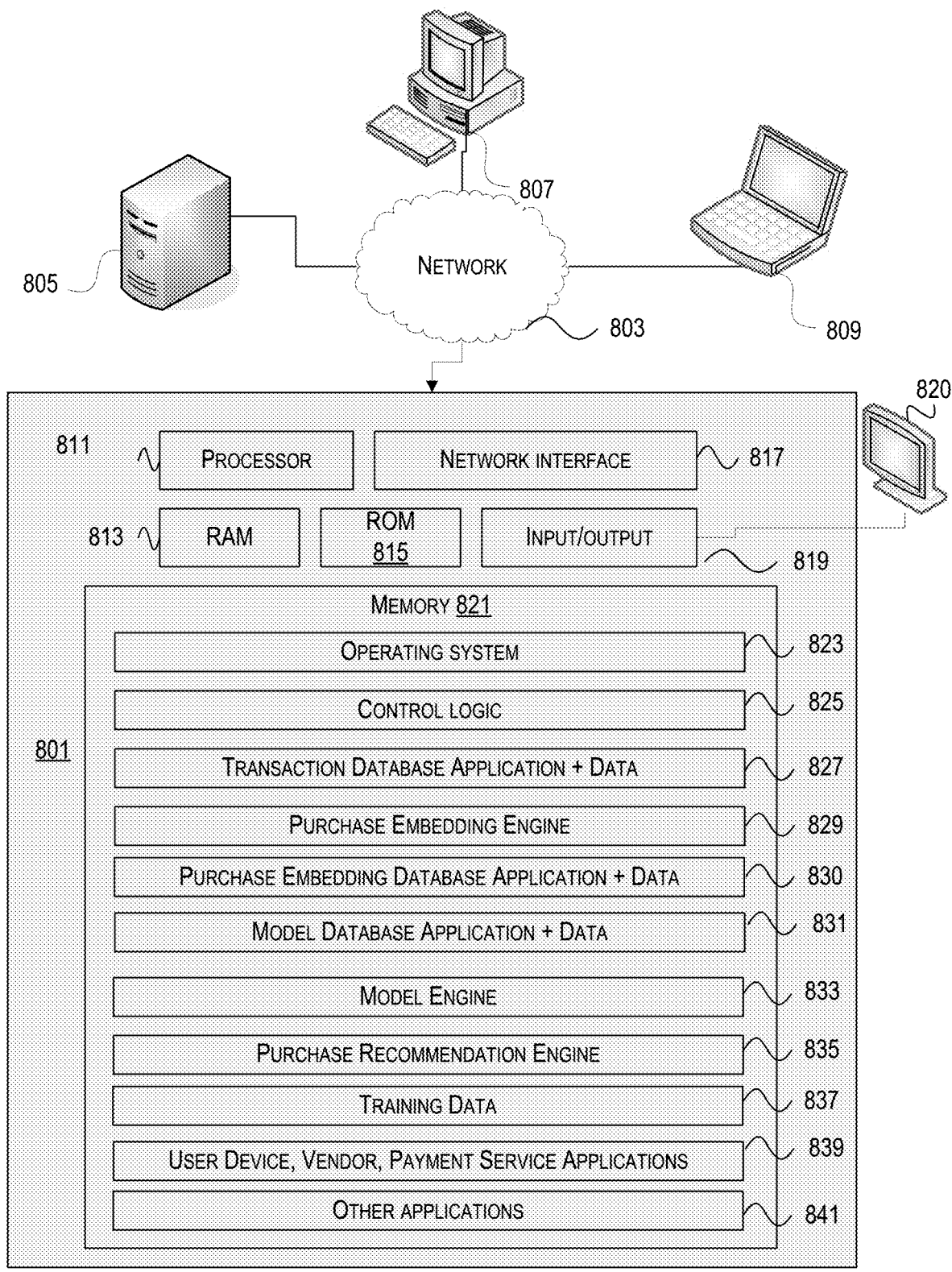
FIG. 8 depicts an example of a computing device that may be used in implementing one or more aspects described herein.

FIG. 8 illustrates one example of a computing device 801 that may be used to implement one or more illustrative aspects discussed herein. For example, devices 101, 102, 103, 104, 105, 106, 107, 108A-C, and 109A-C, and other computing device described herein may be implemented with, and the methods as described with respect FIGS. 4A-B, 5A-C, and 7, and any other methods described herein, may be performed by, one or more computing devices 801, 803, 805, 807, or 809 operating independently or in a networked environment. For example, computing device 801, in some embodiments, may implement one or more aspects of the disclosure by reading and/or executing instructions and performing one or more actions based on the instructions. Computing device 801 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 801, in some embodiments, may operate in a standalone environment. In others, computing device 801 may operate in a networked environment. As shown in FIG. 8, various network nodes 801, 805, 807, and 809 may be interconnected via a network 803, such as the Internet. Other networks may also or alternatively be used, including private intranets, corporate networks, LANs, wireless networks, personal networks (PAN), and the like. Network 803 is for illustration purposes and may be replaced with fewer or additional computer networks. A local area network (LAN) may have one or more of any known LAN topology and may use one or more of a variety of different protocols, such as Ethernet. Devices 801, 805, 807, 809 and other devices (not shown) may be connected to one or more of the networks via twisted pair wires, coaxial cable, fiber optics, radio waves or other communication media.

As seen in FIG. 8, computing device 801 may include a processor 811, RAM 813, ROM 815, network interface 817, input/output interfaces 819 (e.g., keyboard, mouse, display, printer, etc.), and memory 821. Processor 811 may include one or more computer processing units (CPUs), graphical processing units (GPUs), and/or other processing units such as a processor adapted to perform computations associated with speech processing or other forms of machine-learning. I/O 819 may include a variety of interface units and drives for reading, writing, displaying, and/or printing data or files. I/O 819 may be coupled with a display such as display 820. Memory 821 may store software for configuring computing device 801 into a special purpose computing device in order to perform one or more of the various functions discussed herein. Memory 821 may store operating system software 823 for controlling overall operation of computing device 801, control logic 825 for instructing computing device 801 to perform aspects discussed herein. Memory 821 may further store applications and data, such as a Transaction Database application and associated transaction data 827, purchase embedding engine 829, purchase embedding data base application and associated purchase embedding data 830, model database application and associated model data 831, model engine 833, purchase recommendation engine 835, training data 837, user device/vendor/payment service applications 839, and other applications to perform functions and steps as discussed herein. Control logic 825 may be incorporated in and may be a part of dataset processing software 827. In other embodiments, computing device 801 may include two or more of any and/or all of these components (e.g., two or more processors, two or more memories, etc.) and/or other components and/or subsystems not illustrated here.

Devices 805, 807, 809 may have similar or different architecture as described with respect to computing device 801. Those of skill in the art will appreciate that the functionality of computing device 801 (or device 805, 807, 809) as described herein may be spread across multiple computing devices, for example, to distribute processing load across multiple computers, to segregate transactions based on geographic location, user access level, quality of service (QoS), etc. For example, devices 801, 805, 807, 809, and others may operate in concert to provide parallel computing features in support of the operation of control logic 825 and/or applications 827-841.

One or more aspects discussed herein, including the functions and methods as described above with respect FIGS. 1, 2a, 2b, 3, 4a, 4b, 5a, 5b, 5c, 6, and 7 may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein.

Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A computer implemented method for characterizing items using tuples in a multi-dimensional search space, the method comprising:
   retrieving, from one or more databases, a training set comprising a plurality of known tuples each paired with associated parameters;
   applying a machine learning algorithm to the training set to generate a classifier model;
   storing the classifier model in the one or more databases;
   acquiring, by a server via a computer network, transaction records from remote computing devices, wherein the transaction records identify purchases of the items;
   extracting, from the transaction records, purchase parameters characterizing the purchases of the items, wherein the purchase parameters are variables of the classifier model;
   generating, by the server using the classifier model and based on the purchase parameters, computed tuples respectively representing the items in the multi-dimensional search space, wherein a measure of similarity between two of the items is indicated by a distance in the multi-dimensional search space between two of the computed tuples respectively representing the two of the items;
   compiling item records, each including a different one of the computed tuples; and
   storing the item records in one or more databases.

2. The computer implemented method of claim 1, wherein the distance in the multi-dimensional search space is an inner product between the two of the computed tuples.

3. The computer implemented method of claim 1, further comprising:
   receiving a search request comprising one or more search parameters;
   determining, based on the one or more search parameters, a search tuple representing the search request in the multi-dimensional search space;
   calculating one or more distances in the multi-dimensional search space between the search tuple representing the search request and one or more of the computed tuples representing the items;
   identifying, based on the calculating, a cluster in the multi-dimensional search space comprising the search tuple representing the search request and a subset of the one or more of the computed tuples representing the items;
   generating a search result based on the subset; and
   transmitting, from the server via the computer network, the search result to a user computing device.

4. The computer implemented method of claim 3, further comprising:
   determining, from among the item records, a first subset of item records associated a particular purchaser;
   determining, from the first subset of item records, a user preference; and
   generating the search request based on the user preference.

5. The computer implemented method of claim 3, further comprising:
   receiving purchase history parameters associated with the user computing device;
   filtering, based on the purchase history parameters, the item records stored in the one or more databases; and
   determining, based on the filtering, the one or more of the computed tuples representing the items for calculating the one or more distances in the multi-dimensional search space.

6. The computer implemented method of claim 1, wherein compiling the item records comprises:
   identifying, from the purchase parameters, a subset of the purchase parameters characterizing purchasers respectively of the items;
   associating, with each of the computed tuples, one purchase parameter of the subset of the purchase parameters; and
   including, in each of the item records, the one purchase parameter of the subset of the purchase parameters respectively associated with the computed tuple in that item record.

7. The computer implemented method of claim 1, further comprising:
   including, in one of the item records, one of the purchase parameters that indicates:
     a geographic region where an item represented by the computed tuple in the one of the item records is available for purchase, or
     a purchaser preference related to the item represented by the computed tuple in the one of the item records.

8. The computer implemented method of claim 1, wherein the transaction records comprise:
   a purchase receipt acquired from a purchaser computing device,
   a vendor sales record from a vendor computing device, or
   a payment record from a payment service computing device.

9. The computer implemented method of claim 1, wherein the purchase parameters comprise:
   a parameter characterizing one of the items, or
   characterizing transaction information for one of the purchases.

10. The computer implemented method of claim 1, further comprising:
    identifying, from the purchase parameters, information associated with a purchaser of one of the items;
    querying, based on the information associated with the purchaser, the one or more databases for an auxiliary record;
    receiving, based on querying, the auxiliary record, wherein the auxiliary record comprises one or more auxiliary parameters characterizing the purchaser; and
    including one of the one or more auxiliary parameters in one of the item records comprising the computed tuple representing the one of the items.

11. A server comprising:
    at least one computer processor; and
    computer memory comprising computer-executable instructions that when executed by the at least one computer processor, cause the server to:
      query one or more databases for item records associated with a user, wherein each of the item records associated with the user comprises:

a parameter associated with the user, and
a tuple of a plurality of tuples,
wherein the plurality of tuples respectively represent, in a multi-dimensional search space, a plurality of purchasable items, and wherein a measure of similarity between any two items of the plurality of purchasable items is indicated by a distance between two tuples of the plurality of tuples respectively representing the two items;
receive, in response to the query of the one or more databases, the item records associated with the user;
extract a first subset of tuples from the item records associated with the user;
generate a search tuple based on the first subset of tuples;
calculate distances in the multi-dimensional search space between the search tuple and other tuples respectively in other item records in the one or more databases;
receive a geographic location of a user computing device associated with the user;
identify, based on the distances that were calculated and the geographic location, a second subset of tuples of the plurality of tuples within a predetermined distance to the search tuple;
derive, from the second subset of tuples, vendor locations where items represented by the second subset of tuples are available; and
generate a search result based on the second subset of tuples, wherein the search result includes the vendor locations; and
transmit the search result to a user computing device.

12. The server of claim 11, wherein the distance between the two tuples of the plurality of tuples respectively representing the two items is:
an inner product,
a Euclidean distance,
a squared Euclidean distance,
a Manhattan distance,
a Minkowski distance,
a Chebyshev distance,
an edit distance, or
a Levenshtein distance.

13. The server of claim 11, wherein to generate the search tuple based on the first subset of tuples, the computer-executable instructions, when executed by the at least one computer processor, cause the server to:
identify a cluster in the multi-dimensional search space that includes the first subset of tuples; and
select the search tuple from within the cluster.

14. The server of claim 13, wherein the first subset of tuples define vertices of the cluster, and wherein the search tuple is a center of the cluster.

15. The server of claim 11, wherein the vendor locations are within a geographic region that includes the geographic location.

16. A non-transitory machine-readable medium having instructions stored thereon that, when executed by one or more processors, cause the one or more processors to:
acquire, via a computer network, a plurality of purchase receipts from one or more computing devices associated with one or more purchasers, wherein the plurality of purchase receipts respectively identify a plurality of purchases from a plurality of vendors, each of the plurality of purchases being of one of a plurality of items;
extract, from the plurality of purchase receipts, a plurality of parameters characterizing the plurality of purchases;
determine, based on the parameters, a plurality of tuples, wherein each item of the plurality of items is represented by a different tuple of the plurality of tuples in a multi-dimensional search space, and wherein a distance between any two tuples in the multi-dimensional search space provides a measure of similarity between two items respectively represented by the two tuples;
store the plurality of tuples in one or more databases;
identify a first subset of tuples stored in the one or more databases associated with a particular purchaser of the one or more purchasers, wherein the first subset of tuples represents a first subset of items;
receive a purchaser location of the one of the computing devices associated with the particular purchaser;
identify, based on the purchaser location, a second subset of tuples stored in the one or more databases within predefined distances to the first subset of tuples in the multi-dimensional search space;
derive, from the second subset of tuples, vendor locations where a second subset of items represented by the second subset of tuples are available;
generate a recommendation to purchase the second subset of items, wherein the recommendation includes the vendor locations; and
transmit the recommendation to one of the computing devices, which is associated with the particular purchaser.

17. The non-transitory machine-readable medium of claim 16, wherein to identify the second subset of tuples, the instructions, when executed by the one or more processors, cause the one or more processors to:
determine vector relationships in the multi-dimensional search space between the tuples in the first subset of tuples; and
identify the second subset of tuples based on the vector relationships and the predefined distances to the first subset of tuples.

18. The non-transitory machine-readable medium of claim 17, wherein the instructions, when executed by the one or more processors, cause the one or more processors to:
retrieve, from the one or more databases, a training set comprising a plurality of known tuples each paired with associated parameters;
applying a machine learning algorithm to the training set to generate a classifier model; and
storing the classifier model in the one or more databases.

19. The non-transitory machine-readable medium of claim 16, wherein the instructions, when executed by the one or more processors, cause the one or more processors to:
retrieve, from the one or more databases, a classifier model;
determining a subset of the plurality of parameters that are variables of the classifier model; and
calculate, using the classifier model and based on the subset of the parameters, the plurality of tuples.

* * * * *